US 8,935,979 B2

(12) United States Patent
Simmons et al.

(10) Patent No.: US 8,935,979 B2
(45) Date of Patent: Jan. 20, 2015

(54) EVEN BALE BLOCK FOR MONITORING BALE SHAPE IN A ROUND BALER

(71) Applicants: Scott C. Simmons, Lititz, PA (US); Mark K. Chow, Paoli, PA (US); Stephen C. Schlotterbeck, Okeechobee, FL (US)

(72) Inventors: Scott C. Simmons, Lititz, PA (US); Mark K. Chow, Paoli, PA (US); Stephen C. Schlotterbeck, Okeechobee, FL (US)

(73) Assignee: CNH Industrial America LLC, New Holland, PA (US)

( * ) Notice: Subject to any disclaimer, the term of this patent is extended or adjusted under 35 U.S.C. 154(b) by 17 days.

(21) Appl. No.: 13/714,599

(22) Filed: Dec. 14, 2012

(65) Prior Publication Data

US 2014/0165858 A1    Jun. 19, 2014

(51) Int. Cl.
*A01F 15/07*    (2006.01)
*A01F 15/08*    (2006.01)

(52) U.S. Cl.
CPC ............ *A01F 15/0833* (2013.01); *A01F 15/07* (2013.01)
USPC ............................................. 100/88; 100/99

(58) Field of Classification Search
CPC ..................... A01F 15/0833; A01F 15/0825
USPC ...................... 100/50, 88, 99; 56/341, 10.2 R
See application file for complete search history.

(56) References Cited

U.S. PATENT DOCUMENTS

| | | | |
|---|---|---|---|
| 4,106,267 A * | 8/1978 | White ................................ 56/1 |
| 4,135,444 A * | 1/1979 | White et al. ..................... 100/50 |
| 4,224,867 A | 9/1980 | Gaeddert et al. |
| 4,244,167 A | 1/1981 | Seefeld et al. |
| 4,517,795 A | 5/1985 | Meiers |
| 5,408,817 A * | 4/1995 | Wagstaff ........................ 56/341 |
| 5,444,969 A | 8/1995 | Wagstaff et al. |
| 5,615,544 A | 4/1997 | Berger et al. |
| 5,819,643 A | 10/1998 | McIlwain et al. |
| 6,026,741 A | 2/2000 | Lippens et al. |
| 6,874,412 B1 | 4/2005 | Glaszcz et al. |
| 7,913,482 B2 | 3/2011 | Olander et al. |
| 7,975,607 B2 | 7/2011 | Hoover et al. |
| 2010/0318253 A1 | 12/2010 | Brubaker et al. |

FOREIGN PATENT DOCUMENTS

EP    389322 A1    9/1990

* cited by examiner

*Primary Examiner* — Jimmy T Nguyen
(74) *Attorney, Agent, or Firm* — Patrick M. Sheldrake; Seyed V. Sharifi T.

(57) ABSTRACT

A bale size sensing mechanism for an agricultural round baler having bale chamber partially defined by continuous side-by-side belts disposed between a pair of spaced-apart side walls and trained around a plurality of rolls. Bale size sensing mechanisms disposed in each side wall detects the density of the transverse ends of a bale forming within the chamber and provides the measure to a controller which determines the transverse uniformity of the bale. Each sensing mechanism includes a generally planar element having a wedge-shaped periphery with a vertex, the planar element being pivotally coupled to the baler adjacent to the vertex and a portion of the wedge-shaped periphery projecting into the bale-forming chamber to interact with the bale forming therein. The wedge-shaped periphery minimizes open areas within the bale chamber into which turbulent crop could enter and jam the sensing mechanism.

15 Claims, 3 Drawing Sheets

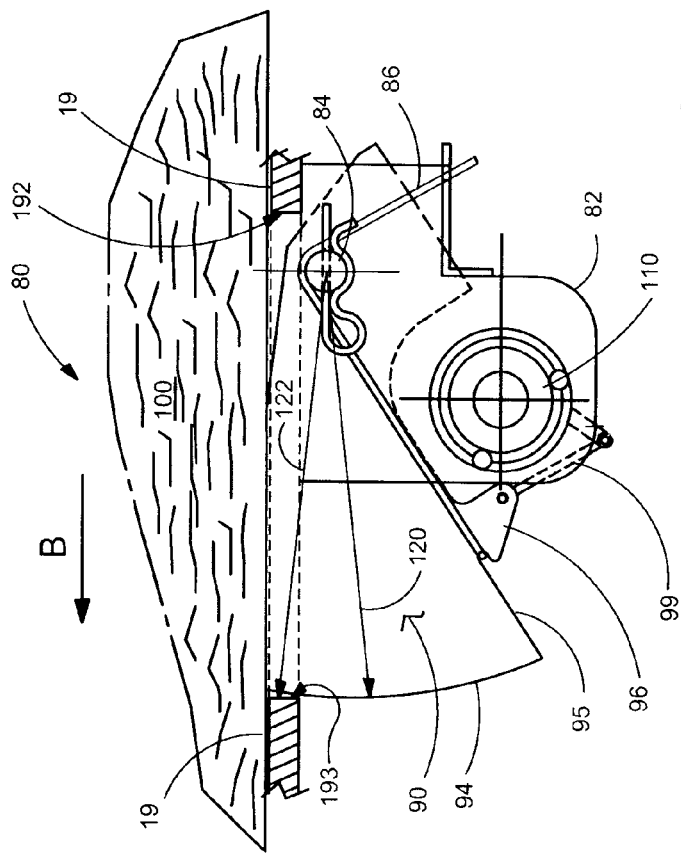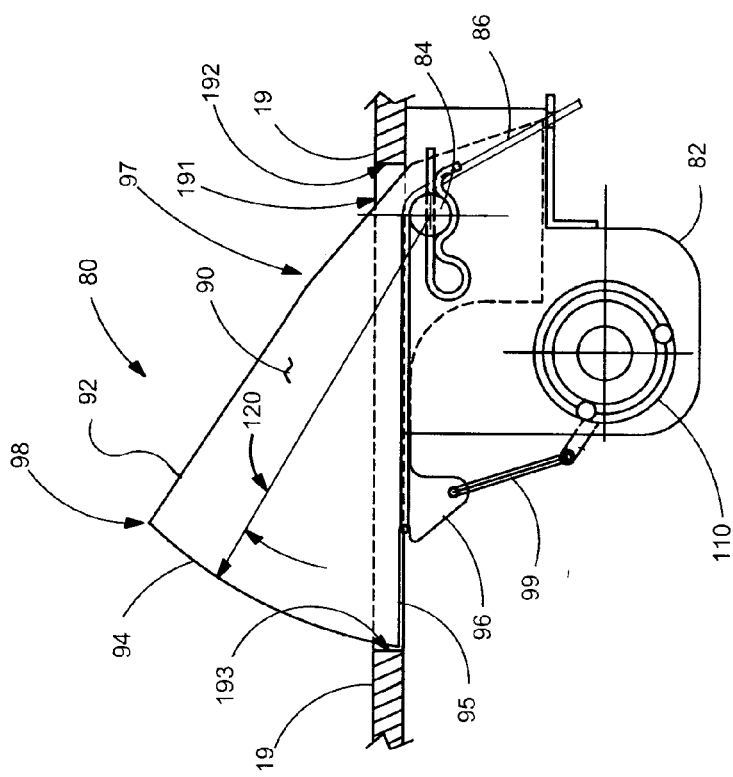

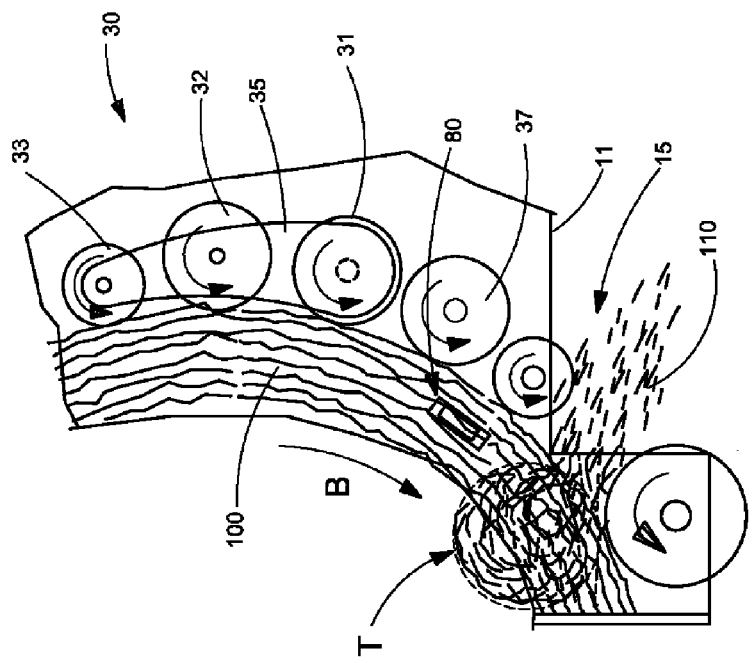
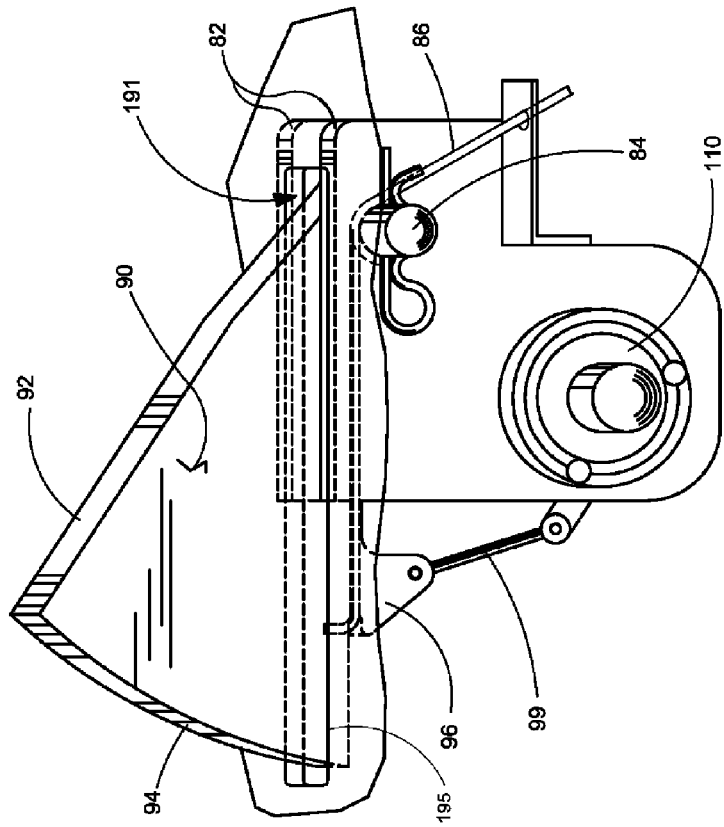

EVEN BALE BLOCK FOR MONITORING BALE SHAPE IN A ROUND BALER

FIELD OF THE INVENTION

The present invention relates generally to a shape monitoring system for agricultural round balers and, more particularly to an improved sensing block for positioning in the bale chamber to sense bale shape for the monitoring system.

BACKGROUND OF THE INVENTION

Round balers have become quite prevalent for their capability of producing a conveniently sized cylindrical bale, very often automatically wrapped with a sheeting material such as net or film. Crop material, such as hay, is picked up from the ground as the baler travels across the field, and is fed into an expandable chamber where it is rolled up to form a compact cylindrical hay package.

Round balers generally have an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms multiple guide rolls are journalled. A biasing force is applied on the take up arms to urge the outer surfaces of the guide rolls against the belts to maintain belt tension and prevent slack from occurring in the belts during expansion and contraction of the chamber.

Because it is not uncommon for windrows of crop material to be narrower than the width of the bale forming chamber, additional steps are necessary to uniformly distribute the hay transversely to avoid poorly shaped bales. Operators were once tasked to watch the growing bale, judge its uniformity, and steer the baler along a path that would more uniformly transversely distribute the crop in the bale chamber. More modern round balers often include sub-systems to monitor and control movement of the belts to produce bales of a desired size, shape uniformity, or density. Bale size monitoring is commonly accomplished through the potentiometers connected by linkages to measuring springs disposed on the side walls of the bale chamber. As the bale grows in the chamber, contact with and deflection of the transversely disposed measuring springs provides an indication of the transverse uniformity of the forming bale.

Measuring springs are easily deformed or broken by turbulent crop flow in the bale forming chamber. Turbulent crop flow results in crop moving in a direction reversed from the normal direction of movement, particularly adjacent to the side walls where the measuring springs are located. As the springs typically have a free end projecting into the bale forming chamber, crop moving in the reverse direction wedges between the free end of the measuring spring and the side wall, causing the measuring spring to be bent or broken. Further, the spring ends tend to be honed to a dangerously sharp edge by friction of the passing crop.

It would be desirable to provide a sensing mechanism that would provide a reliable indication of transverse bale size as a bale forms in a bale-forming chamber that withstands turbulent crop flow in the chamber without adverse impact on the bale measuring function. Additional advantages would be realized by a sensing mechanism in a bale chamber that is shaped to prevent gaps in which turbulent crop flow can accumulate thereby reducing the likelihood of damage or mal-adjustment of a bale measuring apparatus. Still further advantages would be realized by a bale size sensing mechanism that is formed of robust materials offering improve durability while providing a reliable and easily calibrated base shape monitoring sensing mechanism.

SUMMARY OF THE INVENTION

Accordingly, the present invention, in any of the embodiments described herein, may provide one or more of the following advantages:

It is an object of the present invention to provide an improved sensing device for monitoring bale size in an agricultural round baler that includes a wedge-shaped plate pivotally coupled to the baler and in contact with the transverse ends of a bale in the bale forming chamber to monitor the shape of the forming bale. The baler has a crop pickup for lifting crop and delivering it into an expandable bale forming chamber having opposing side walls between which a plurality of side-by-side belts are trained around a plurality of rolls to spirally wind the incoming crop into a cylindrical bale. An improved sensing device is disposed on each side wall with a portion of the wedge-shaped plate projecting into the bale forming chamber and positioned so that contact with the bale ends provides a means to sense the density of the ends of the forming bale and thereby determine its shape uniformity.

It is a further object of the present invention to provide an improved contact sensing mechanism for monitoring bale shape in a bale-forming chamber of an agricultural round baler that enables an electronic sensor to be disposed outside of the bale-forming chamber where it is protected from interaction with the crop in the bale-forming chamber and connected by linkage to the contact sensing mechanism.

It is a further object of the present invention to provide an improved contact sensing mechanism for monitoring bale shape in an agricultural round baler wherein a generally planar element having a wedge-shaped periphery with a vertex is pivotally coupled to the baler adjacent to the vertex and a portion of the wedge-shaped periphery projects into the bale-forming chamber to interact with the bale forming therein.

It is a still further object of the present invention to provide an improved contact sensing apparatus for monitoring crop density in the ends of a forming bale in an agricultural round baler that is durable in construction, inexpensive of manufacture, carefree of maintenance, easily assembled, and simple and effective to use.

These and other objects are achieved according to the instant invention by providing a bale size sensing mechanism for an agricultural round baler having bale-forming chamber partially defined by a plurality of continuous side-by-side belts disposed between a pair of opposing, spaced-apart side walls and trained around a plurality of fixed rolls and at least one moveable roll. Bale size sensing mechanisms disposed in each side wall detects the density of the transverse ends of the bale forming within the chamber position and provides the measure to a controller which determines the transverse uniformity of the bale and may adjust positioning of one or more of the belts to maintain a transversely uniform bale shape. Each sensing mechanism includes a generally planar element having a wedge-shaped periphery with a vertex, the planar element being pivotally coupled to the baler adjacent to the vertex and a portion of the wedge-shaped periphery projecting into the bale-forming chamber to interact with the bale forming therein. The wedge-shaped periphery minimizes open areas within the bale chamber into which turbulent crop could enter and jam the sensing mechanism.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a side section view of the round baler of FIG. 1 shown with the bale forming chamber configured at the beginning of a bale forming cycle;

FIG. 3 is a detail view of a bale size sensor incorporating one embodiment of the present invention shown in a first position;

FIG. 4 is a detail view of the bale size sensor of FIG. 3 shown in a second position; and FIG. 5; is a second embodiment of the bale size sensor show on a typical round baler.

DESCRIPTION OF THE PREFERRED EMBODIMENT(S)

Figure 1:
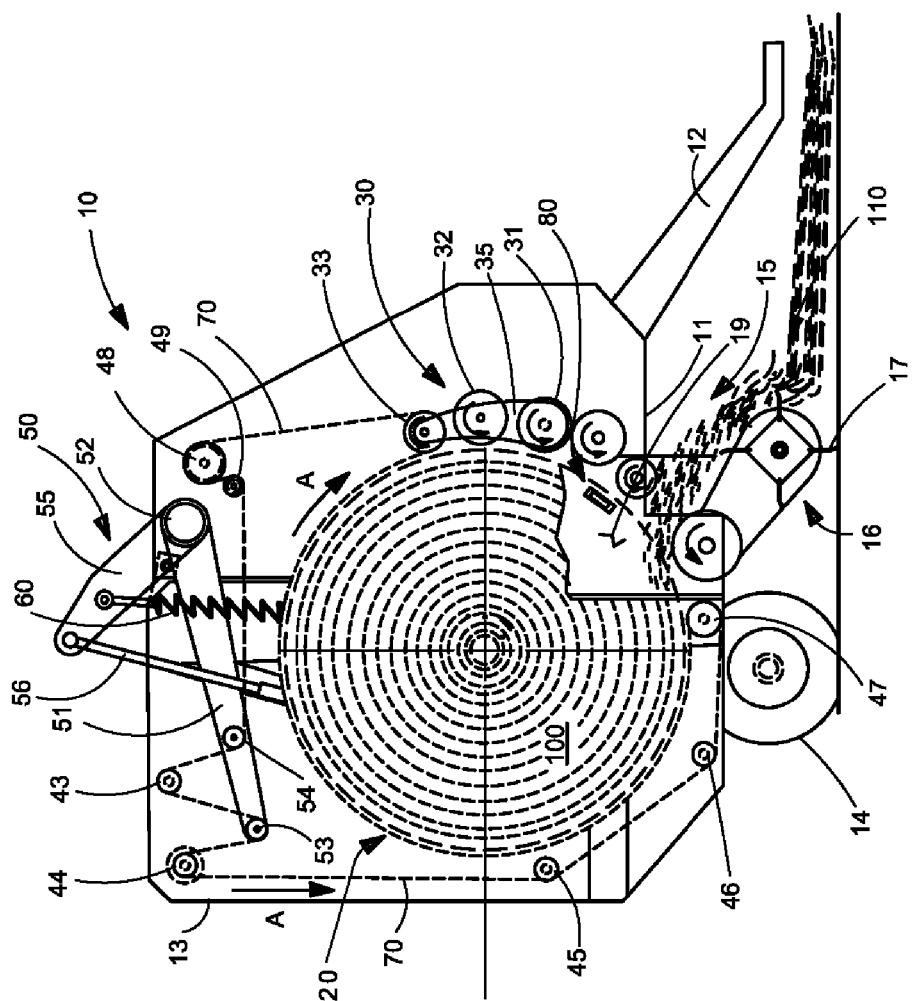
FIG. 1 is a side section view of a typical agricultural round baler on which the present invention is useful, shown with a near-complete bale in the bale chamber.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to the figures, a generally well-known round baler 10 which incorporates the preferred embodiment of the present invention, includes a main frame 11, including a pair of spaced-apart and opposing side walls 19 supported by a pair of wheels 14 (only one shown). A tongue 12 is provided for connection to a tractor. Pivotally connected to the sides of main frame 11 is tailgate 13 which may be closed (as shown in FIG. 1) during bale formation or pivoted open by a tailgate actuator (not shown) to discharge a completed bale 100. A conventional pickup 16, mounted on main frame 11, includes a plurality of tines 17 movable in a predetermined path to lift crop material 110 from the ground and deliver it rearwardly toward an inlet opening 15 and into the interior of the baler.

A chamber 20 for forming bales is defined partly by a sledge assembly 30 comprising a plurality of rollers 31, 32 extending transversely in the arcuate arrangement shown in FIG. 1. Rollers 31, 32, 33 are journalled at their ends in a pair of spaced apart arms 35, one of which is shown. These arms are pivotally mounted inside main frame 11 on stub shafts for providing movement of sledge assembly 30. Rollers 31, 32 are typically driven in a counter-clockwise direction by conventional means (i.e., chains and sprockets or gears) connected to and powered by a prime mover. A freely rotatable idler roller 33 is also carried by arms 35. Additional rolls are provided to control movement and position of the bale in the chamber.

The bale forming chamber is further defined by an apron 70 comprising a plurality of continuous side-by-side belts supported by guide rolls 43, 44, 45, 46, 47 rotatably mounted in tailgate 13 and a drive roll 48, mounted on main frame 11. Apron 70 passes between roller 32 on sledge assembly 30 and idler roller 33, and is in engagement only with idler roller 33 and not roller 32 which is located in close proximity to the apron belts to strip crop material from the belts, in addition to its bale forming function. Drive roll 48 is powered via a power take-off from the tractor and a drive train (not shown) which moves apron 70 along its changing path, indicated generally by arrow A in FIG. 1. An additional guide roll 49 ensures proper driving engagement between apron 40 and drive roll 48.

A belt take up assembly 50 comprising a pair of take up arms 51 (only one shown) mounted to pivot conjointly with a cross shaft 52 and carry additional guide rolls 53, 54 is provided for supporting apron 70 and maintaining it in adjacent contact with the forming bale 100 as the bale size changes (increases) during the baling process. A belt tension lever arm 55 is also affixed to shaft 52 to pivot in conjunction with take up arms 51. A return spring 60 is secured between the baler chassis 11 and tension lever arm 55 to bias the take up assembly 50 toward an empty bale chamber position and move the take up arms 51 toward the bale starting position following ejection of a completed bale. A hydraulic bale tension cylinder 56 is mounted between tailgate 13 and take up arms 51 and configured to resist movement of the take up assembly 50 from the empty bale chamber position toward the full bale position.

Rounds balers of the aforementioned type and operation thereof are well known in the art. Exemplar balers and their operation are described in additional detail in U.S. Pat. Nos. 4,870,812 and 5,367,865, both to Jennings et al., each being incorporated herein by reference.

Systems for monitoring the shape of bales as they are formed in the bale chamber may be provided on the baler 10. Such systems generally employ sensing structures to measure bale density at the transverse ends or monitor variations in belt tension in the apron. The systems may provide signals to the vehicle operator to guide steering so the incoming crop is more uniformly transversely distributed in the bale chamber, signals to an automated vehicle guidance system, or signals to the baler to adjust belt movement to more evenly distribute the crop transversely in the bale chamber. Bale shape monitoring systems traditionally comprise sensing elements disposed on the side walls of the bale chamber that contact the transverse ends of the forming bale. The sensing elements are connected by linkages to potentiometers or the like so that movement of the sensing elements can be converted to electrical signals for use by vehicle or implement control systems. One such monitoring system is described in U.S. Pat. No. 5,615,544 issued to Berger, et al. on Apr. 1, 1997, the entirety of descriptive portion being incorporated by reference herein.

Referring to FIGS. 2 and 3, one bale sensing assembly 80 embodying the concepts of the present invention is illustrated. The bale sensing assembly 80 is mounted on a side wall 19. Another sensor assembly is similarly mounted on the opposing side wall (not shown) of baler 10, in a paired arrangement as mentioned above. For the purposes of this description, only one bale sensing assembly 80 will be described in detail but it is intended that like comments would apply to its counterpart assembly mounted on the opposing side wall.

A mounting bracket 82, affixed to the outside of side wall 19 adjacent to slot-like aperture 191, has mounted thereon a pivot axle 84 for connection to a moveable bale measuring block 90. The measuring member 90 is pivotable between generally opposing extended and retracted positions. While in the extended position, the measuring member partially protrudes through the aperture 191 in the side wall and into the bale-forming chamber 20 where it may engage the crop material at the bale end. When in the retracted position, the measuring member 90 is substantially non-protruding from the interior surface of the side wall. The bale measuring member is a generally solid member having spaced-apart first and second side surfaces surrounded by a contact edge 92, a blocking edge 94, and a back edge 95 which generally define a perimeter of the measuring block. In one embodiment, the measuring member perimeter is generally pie- or wedge-shaped, having the pivot axle positioned adjacent to the apex. A linkage connector 96 is provided adjacent to the back edge 95 to allow connection of the measuring block 90 to a position sensor 110 via linkage 99. Spring 86 or a similar biasing element engages the measuring member 90 to urge it inwardly into the bale chamber. When little or no crop material is present in the bale forming chamber, the spring biasing element 86 forces the measuring member 90 so that it protrudes into the bale chamber as shown in FIG. 2. As the bale forms in the chamber, the crop material engages the contact edge 92 and ultimately pivots the measuring member outwardly from the bale forming chamber.

Aperture 191 includes a leading end 192, a trailing end 193, and spaced-apart side ends 195 having a slot-like configuration which, in relation to measuring member 90, allows minimal open area surrounding the measuring member 90 so that crop material accumulation in the gap (open area) between the aperture 191 and the measuring block is minimized. Blocking edge 94 is arcuately shaped to maintain a consistently minimal clearance between blocking edge 94 and the downstream end 193 of aperture 191 as the measuring member 90 pivots between the extended and retracted positions. Blocking edge 94 is preferably contoured with a constant radius from the pivot center of pivot axle 84, the constant radius being slightly less than the distance from the center of pivot axis 84 to the downstream end 193 of aperture 191 to allow movement of the measuring member without contacting the baler side wall. Further, when the measuring member 90 is moved toward the extended position, the blocking edge 94 and the solid first and second surfaces prevents crop material from accumulating between the contact edge 92 and the interior surface of the side wall where it could prevent the measuring member from retracting through the aperture 191, rending the sensing assembly 80 nonfunctional.

During bale forming operation, crop material adjacent the side walls in the peripheral portion of the cylindrical package being formed is in continuous contact with the measuring member 90 of opposing similar bale sensing assemblies 80. More specifically, crop material traverses the contact edge 92 of measuring members in a longitudinal fashion along a generally spiral path from the upstream or apex end 97 to the downstream or distal end 98 of the measuring member. In this manner the degree of crop compaction is sensed as the preset bias is overcome and the measuring members are urged pivotally outwardly from the bale chamber. The pivotal position of the bale measuring member 90 will vary based on the force exerted by crop material passing thereover and is determined by sensor 110. This force is directly proportional to the degree of compactness of the crop material. Comparing the values for sensors on both sides of the bale chamber provides an indication of the lateral uniformity of the bale to be derived and used to adjust lateral crop placement in the bale chamber. Sensor 110 is preferably a potentiometer sealed for protection from dust and debris common to the environment adjacent to the bale chamber in a round baler.

Mounting bracket 82 and measuring member 90 are formed from high-strength steel plate of sufficient thickness to assure that the pieces are not easily deformed by interaction with the crop material.

The bale measuring member 90 is arranged such that the pivot 84 is upstream of the contact and blocking edges 92, 94 relative to the movement of the crop in the rotating bale, shown as arrow "B" in FIGS. 3 and 5. Further, blocking edge 94 extends from the downstream end of contact edge 92 toward back edge 95, which is positioned outside of the bale chamber side wall 19. The extension of blocking edge 94 prevents crop material from lodging between the contact edge 92 and the side wall 19 where it might impede movement of the measuring member 90. Referring to FIG. 5, the positioning of the bale sensing assembly 80 on the side wall 19 is such that the measuring member is located outside of the zone of turbulent crop movement where incoming crop enters the bale forming chamber through the inlet opening 15, shown as encircled area "T" in FIG. 5. This positioning further reduces the tendency for crop to become entangled in the measuring member 90 as crop in contact with the measuring member is moving predominately in a single direction, shown as arrow "B."

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A bale compaction sensing mechanism for an agricultural round baler having a bale forming chamber defined in a space between opposing frame-supported side walls and configured to form incoming crop material into a generally spirally wound, cylindrically shaped bale of increasing diameter, the sensing mechanism comprising:
   an elongate, slot-like aperture having an upstream end and a downstream end separated by a pair of spaced-apart side ends, the aperture being disposed in one of the side walls; and
   a measuring member pivotally connected to the side wall at a point laterally outside of the bale forming chamber adjacent to said upstream end and moveable between generally opposing extended and retracted positions, said measuring member having a contact edge extending distally away from said pivotal connection and partially projecting inwardly through said aperture into the bale forming chamber for contact with the bale when in said extended position, and a blocking edge extending outwardly across the distal end of said contact edge and at least partially extending into said aperture to prevent entrapment of crop material between said contact edge and the side wall, wherein a sensor mounted outside of the baling chamber is configured to detect the position of a portion of the measuring member extending outside of the bale forming chamber.

2. The sensing mechanism of claim 1, further comprising a spring element configured to bias said measuring member toward the extended position.

3. The sensing mechanism of claim 1, wherein said contact edge comprising at least a first portion and a second portion, wherein the first and second portions have different profiles.

4. The sensing mechanism of claim 1, wherein a majority of said measuring member is located above a roller forming an upper boundary of an inlet to the bale chamber.

5. The sensing mechanism of claim 1, further comprising a back edge extending distally away from a pivotal coupling connecting the member to the sidewall outside of the chamber and angled in relation to said contact edge, said back edge remaining within or outwardly positioned of said aperture as said measuring member pivots between said extended and retracted positions.

6. A bale compaction sensing mechanism for an agricultural round baler having a bale forming chamber defined in a space between opposing frame-supported side walls by a plurality of side-by-side continuous belts trained around a plurality of transversely elongate guide rollers including fixed rollers and at least one moveable roller, said bale forming chamber configured to form a generally spirally wound, cylindrically shaped bale of increasing diameter by motion of said plurality of belts and rotation of said plurality of guide rollers, the sensing mechanism comprising:
    an elongate, slot-like aperture having generally opposing upstream and downstream ends separated by a pair of spaced-apart side ends, the aperture being disposed in one of the side walls;
    a measuring member pivotally connected to the side wall adjacent to said upstream end and moveable between generally opposing extended and retracted positions, said measuring member having generally opposing first and second side surfaces bounded by a contact edge extending distally away from said pivotal connection, a back edge extending distally away from said pivotal connection and angled in relation to said contact edge, and a blocking edge extending between the distal ends of said contact edge and said back edge, said measuring member being biased toward said extended position in which said measuring member partially projects into the bale chamber through said aperture whereupon at least a portion of said contact edge engages the bale; and
    a position sensor connected to a portion of said measuring member that remains outside of the bale chamber is configured to sense pivotal position of said measuring member and initiate a signal representative thereof.

7. The sensing mechanism of claim 6, further comprising a spring element configured to bias said measuring member toward the extended position.

8. The sensing mechanism of claim 7, wherein said position sensor is outwardly disposed of the bale forming chamber and connected to said measuring member by a linkage.

9. The sensing mechanism of claim 6, wherein the contact edge comprising at least a first portion and a second portion, wherein the first and second portions have different profiles.

10. The sensing mechanism of claim 9, wherein said back edge is outwardly disposed from the bale forming chamber.

11. A sensing mechanism for monitoring bale density in an agricultural round baler, the baler having a bale forming chamber disposed between opposing frame-supported side walls and configured to receive an incoming crop material through a crop inlet and spirally wind the crop material into a generally cylindrically shaped bale of increasing diameter, the sensing mechanism comprising:
    an elongate aperture in one of the side walls, the aperture having generally opposing upstream and downstream ends separated by a pair of spaced-apart side ends; and
    a generally wedge-shaped measuring member having an apex end and pivotal connection to the side wall adjacent to said upstream end thereby enabling member movement between generally opposing extended and retracted positions, said apex end located forward of the pivotal connection with respect to a direction of crop movement, said measuring member having a contact edge extending distally away from said apex end projecting inwardly partially through said aperture into the bale forming chamber for contact with the bale when in said extended position, and a blocking edge extending between distal ends of said contact edge and said back edge, and a blocking edge extending outwardly from the distal end of said contact edge and extending into said aperture.

12. The sensing mechanism of claim 11, further comprising a spring element configured to bias said measuring member toward the extended position.

13. The sensing mechanism of claim 12, further comprising a sensor connected to said measuring member configured to sense pivotal position of said measuring member and initiate a signal representative thereof wherein.

14. The sensing mechanism of claim 11, wherein said contact edge comprising at least a first portion and a second portion, wherein the first and second portions have different profiles.

15. The sensing mechanism of claim 14, wherein said aperture is upstream of the crop inlet relative to the direction of crop material spiral winding.

* * * * *